Dec. 6, 1960 D. C. ABBOTT Re. 24,901

MACHINE FOR FORMING HOLLOW SAND-RESIN CORES AND MOULDS

Original Filed Dec. 8, 1954 3 Sheets-Sheet 1

INVENTOR.
Donald C. Abbott
BY Chas. Denegre
Attorney.

MACHINE FOR FORMING HOLLOW SAND-RESIN CORES AND MOULDS

Original Filed Dec. 8, 1954 3 Sheets-Sheet 2

INVENTOR.
Donald C. Abbott
BY Chas. Denegre
Attorney.

MACHINE FOR FORMING HOLLOW SAND-RESIN CORES AND MOULDS
Original Filed Dec. 8, 1954 3 Sheets-Sheet 3
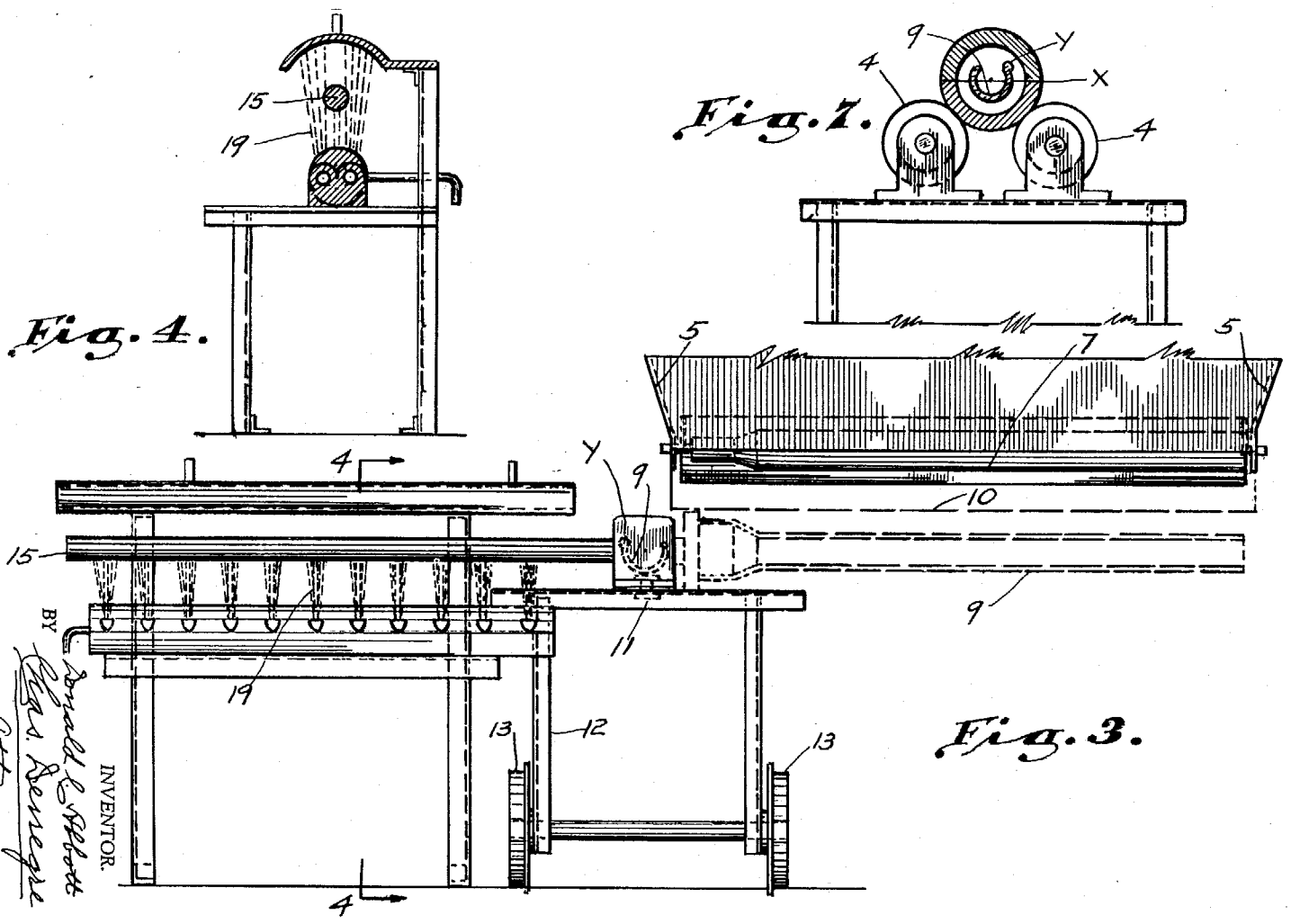

United States Patent Office

Re. 24,901

Reissued Dec. 6, 1960

24,901

MACHINE FOR FORMING HOLLOW SAND-RESIN CORES AND MOULDS

Donald C. Abbott, Rte. 1, Box 299, Leeds, Ala.

Original No. 2,856,655, dated Oct. 21, 1958, Ser. No. 473,828, Dec. 8, 1954. Application for reissue Apr. 6, 1959, Ser. No. 804,559

2 Claims. (Cl. 22—40)

Figures 1, 5, 6:
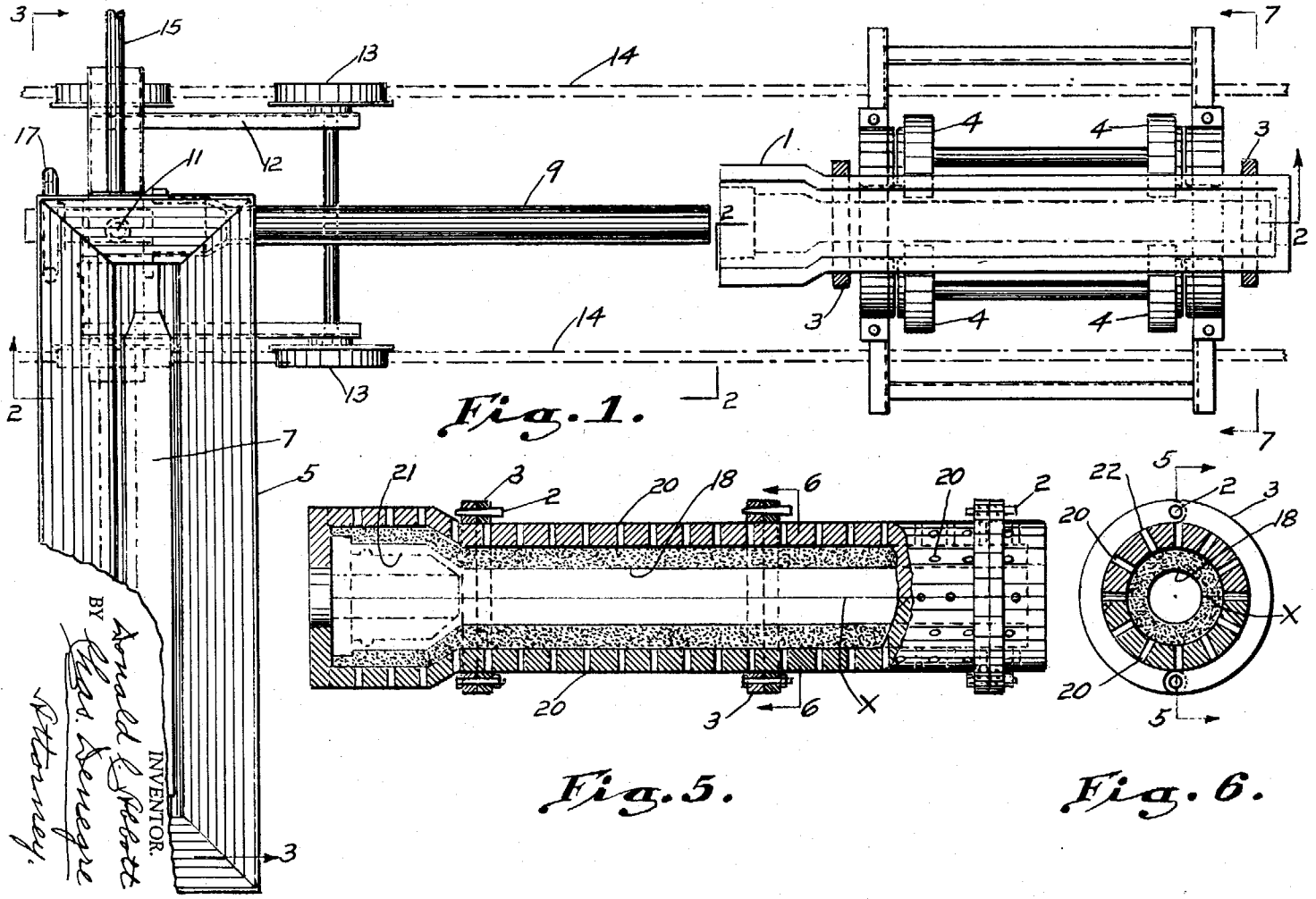

Matter enclosed in heavy brackets [ ] appears in the original patent but forms no part of this reissue specification; matter printed in italics indicates the additions made by reissue.

This invention relates to the centrifugal process or method of forming a shell mold or core for metal casting operations, and particularly to a machine and process for forming shell-type sand-resin cores or molds.

Recently developed techniques in foundry practice incorporate the use of thin-walled molds and cores composed of sand and plastic binders. These procedures, frequently referred to as the shell molding process is particularly suited for the production of precision castings in a wide variety of metals.

A principal object of this invention is to provide an inexpensive machine and process for rapidly forming hollow sand-resin molds and cores for high production use in the shell molding process. A further object is to provide a machine whereby a metal mold can be lined with a thin shell of sand, then to transfer this shell to a metal pouring or back-up flask for casting therein. In effect this would be the same as the present method of casting centrifugally pressure pipe in cast iron molds, except with the new process I form a sand shell inside of the cast iron mould. The purpose of this shell lining is to protect the mold from the high temperature of molten metal. This process will eliminate annealing the casting because it will be cast against sand instead of an iron mold. Shell molds of this type can be used for casting tubular articles such as pressure pipe, soil pipe (double or single hub), hydrant barrels, bushing stock, and other castings from a few inches to several feet long. This machine will also make hollow cores of the type used in making soil pipe where poured statically and will take the place of the solid core and arbor now used. Any small burrs may be removed from inside of a finished shell with a revolving brush while graphite or other material for protecting the face of the shell can be applied at the same time.

This invention is an improvement over my core making device shown in my pending application under Serial Number 433,478 filed June 1, 1954.

Essentially the shell molding process consists of using a thermosetting plastic or resin as a binder for the sand grains to form thin-walled molds. The molding material, which is generally a dry mixture with a major proportion of a silica sand and a minor proportion of a thermo-setting binder, and is used in powder form with no water being added. Phenol formaldehyde and melamine formaldehyde resins are typical examples of the type of thermo-setting resin binders used. The sand employed is preferably free of metal oxides, clay, moisture and organic matter. These sand-resin molds are prepared by allowing the dry mixture of said and resin power to come in contact with a hot metal pattern for a short time. In the present invention the pattern would be known as a mold and the sand-resin is forced by centrifugal force against the mold wall, which is heated, where it cures to form the sand shell. The curing takes place when a layer of the said mixture adheres to the heated metal surface due to the heating of the resin to its curing temperature and thereby accurately reproducing exact pattern or mold detail and contours. A metal mold must be employed because they are subjected to high temperatures of between 250 to 500 degrees F. which are typical, but temperatures up to 850 degrees F. may be used under certain conditions. The mold temperature and the length of time the molding material is allowed to remain in contact with the heated metal surface will determine the depth of bake the shell will receive. The time will range from a few seconds to approximately three minutes, depending upon the thickness of the shell to be baked. This baking operation results in the conversion of the resinous material to a hard, insoluble binder which securely bonds the sand grains together thus forming the thin-walled core or mold, having good dimensional stability, satisfactory gas permeability, smooth surface and adequate strength. Also the process is not only rapid and relatively simple, but it results in considerably improved working conditions in foundries.

Other objects and advantages will appear from the drawings and specifications.

Figure 2:
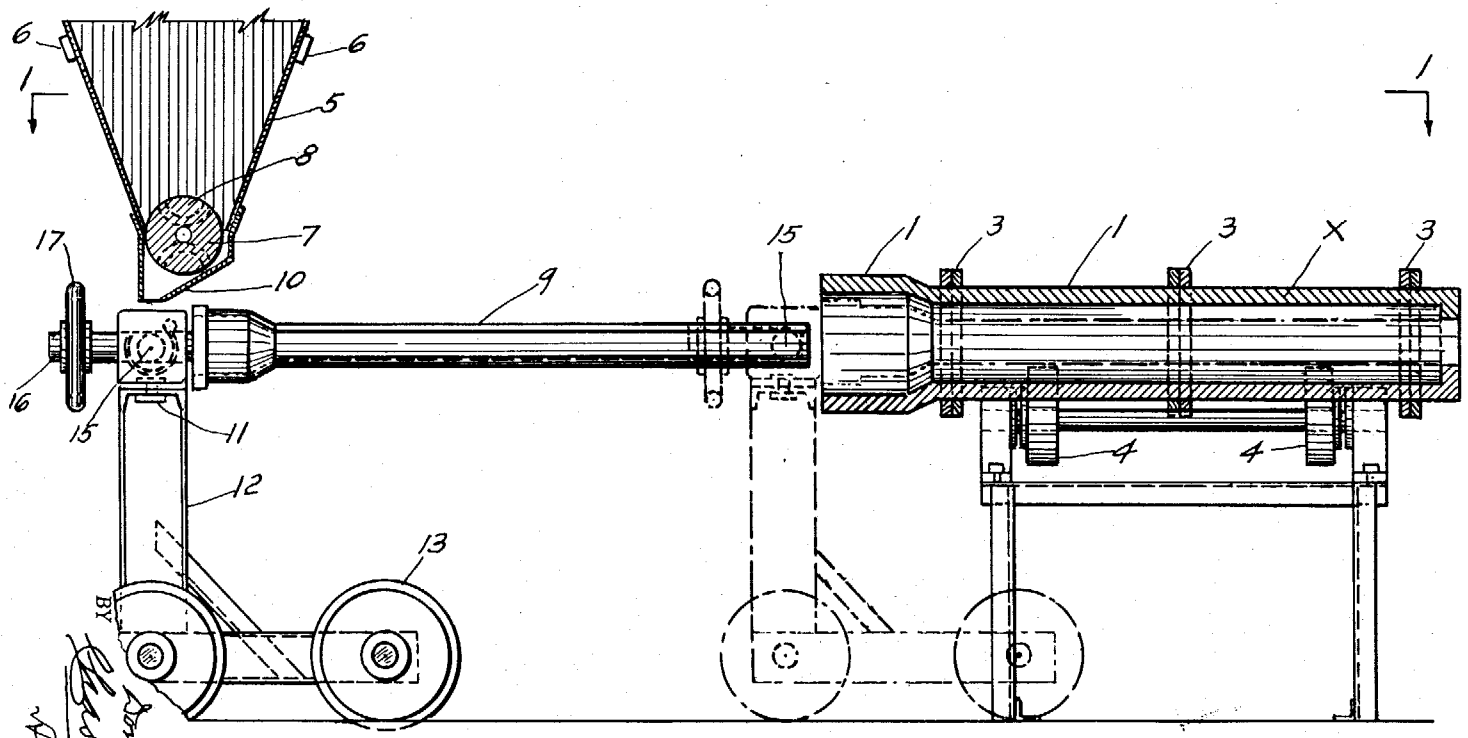

By referring generally to the drawings, a part of this application, it will be observed that Fig. 1 is a plan view on line 1—1 of Fig. 2 showing the sand mixture bin, trough for supply of sand to the mold, the mold and wheels; Fig. 2 is a side elevational view on line 2—2 of Fig. 1 showing the bin, mold and wheels; Fig. 3 is a sectional view on line 3—3 of Fig. 1 showing the bin and heating assembly for the heating element; Fig. 4 is a cross sectional view on line 4—4 of Fig. 3 showing the heating assembly with heating member therein; Fig. 5 is a longitudinal sectional view on line 5—5 of Fig. 6, part full view, showing the mold and shell therein; Fig. 6 is a cross sectional view on line 6—6 of Fig. 5 assuming Fig. 5 to be a full view; and Fig. 7 is an end view of the mold and rollers supporting same.

Similar reference numerals refer to similar parts throughout the several views.

Referring to the drawing in detail it will be seen that the machine comprises the core box or mold 1 which is in place for spinning. The mold consists of a cast iron cylinder which is split along its horizontal center at "x" to thus form two halves, assembled and alined by dowel pins 2 and clamps 3 while spinning on rollers 4. The spinning may be by any power and means suitable for the purpose. It has been found by experience that an alternate type of mold with ribs could be used which would prevent warping while heating. The mold may be heated electrically or by a conventional oven to approximately 450 to 500 degrees. Also the mold may be heated before being placed on the rollers for spinning. A third roller could be used to better hold the mold in place while spinning.

The hopper 5 of the assembly is supported by hangers (not shown) attached at 6. A revolvable roller 7 is mounted in the bottom of the hopper. This roller is provided with integral grooves 8 for filling by the sand mixture contained in the hopper. The roller is revolvable by manual means or power gears. Each groove contains sufficient sand to fill the trough 9. Shims may be used in the grooves to regulate the amount of sand for use in each operation thereof. The grooves are deeper at one end thereof to hold an excess of sand for a bell of a pipe. Attached to the hopper there is a chute 10 to guide the sand into the trough 9. The trough is pivotally supported at 11 turret fashion on the carriage 12 having wheels 13 rollable on rails 14. *One edge of the trough 9 extends above the other edge thereof and is curved or rounded at Y, whereby it engages and smooths the inner surface of the sand shell as the mold 1 rotates.*

*As clearly shown in Fig. 2, one end of the trough 9 is enlarged whereby it is adapted to hold an additional amount of a sand-resin mixture.* A heating element 15 is also supported by an end thereof at 11 and extends from the support at a 90 degree angle compared to the trough. A shaft 16 with wheel 17 thereon provides means for manually revolving the trough, swinging the trough or heating element into position for inserting into the mold, and pushing the assembly along on the rails. After the trough has emptied the sand into the mold it is withdrawn by pulling the carriage to its position under the hooper. In this position the heating element is turned for inserting into the mold to cure the inside of the sand shell 18. The heating of the element may be accomplished electrically or by gas flame as indicated by broken lines 19 in Fig. 4. The outside of the shell is cured by the heat of the mold. When the shell has been cured it is removed from the mold by removing one half of mold and replacing this half with one half of a mold having vent holes 20 as shown in Fig. 5, then rolling over so other half can be replaced. This flask is an exact duplicate of the mold except it is slightly longer to accommodate the head core 21 which is shown in place by broken line in Fig. 5. Also the flask is provided with the vent holes 20 to allow gases to escape while metal is being poured. The flask may be reinforced with ribs if desired to eliminate warpage. The flask may be cooled if necessary by passing it through water after the mold has been poured. Since the pouring flask is in halves it is very easy to remove the casting from the mold after it has solidified.

An alternate method is to provide the mold in which the shell is made with vent screens or slits and use this mold for pouring metal therein instead of transferring the shell to the pouring flask.

In operation the hopper is first filled with a mixture of resin-sand. The measuring device in the hopper is revolved to thus deposit the sand into the trough which is positioned under the hopper. Then the loaded trough is moved into the spinning mold and the sand is deposited evenly in the mold from one end to the other with an additional amount of sand to make a bell or hub for making soil or pressure pipe. After the trough has delivered the sand it is returned to its position under the hopper. The resin is cured by the residual heat of a previous molding and the electric heating element. In the case of making cores, the core is removed from the machine and carried to the floor. For making pipe the shell would be either removed from the mold in which it was made and put into a pouring flask or poured in the same flask in which it was made.

The machine may be used to make a shell tubular core as well as molds.

The various parts of the machine may be made of any material suitable for the purpose; also may be made in different sizes and capacities, depending on how and where to be used.

While I have shown and described the preferred embodiment of my invention, I do not wish to limit same to the exact and precise details of structure, but reserve the right to make all modifications and changes so long as they remain within the scope of the invention and the following claims.

Having described my invention I claim:

[1. A machine for forming hollow sand-resin cores and molds of the character described, said apparatus comprising a metal mold, a hopper adapted to contain a supply of sand and resin mixture, a roller supported revolvably in the bottom portion of said hopper, said roller having two integral grooves along the major axis and spaced directly opposite from each other throughout its length, a carriage structure supported on axles and wheels, said carriage being located under said hopper and in proximity to the mold, a track below said carriage for said wheels to roll upon, a trough having a curved edge supported by one of its ends and being attached rotatably on a vertical axis to the top of said carriage and adapted for rotation about its long axis, a bar adapted for use as heating element attached rotatably at one of its ends to the top of said carriage, said trough and said bar being rigidly fixed to said carriage and said trough and said bar being spaced apart by an angle of 90 degrees, a short shaft attached at one end to the revolvable trough, a wheel mounted on the other end of said shaft, said wheel and shaft means being adapted for manual operation to partly revolve said trough and also to swing said heating element into engagement with said mold, said mold consisting of two equal halves with band and dowel pins for holding said mold halves together, a plurality of rollers supported on a frame, said rollers being adapted for revolution from an independent source of power, said mold being supported upon said rollers, said trough and said carriage being adapted for movement along said track to insert said trough into said mold and therein said trough being revolved by power applied upon said wheel and said shaft located at the top of the wheeled carriage, a heating assembly positioned near the bottom of said hopper, said bar attached to said carriage being adapted for heating by said heating assembly when the bar is in line with the longitudinal axis of the bottom of the hopper.]

[2. A process for forming hollow sand-resin cores and molds as follows: placing a supply of a sand-resin mixture in a hopper, filling one of the grooves in a roller in the bottom of the hopper with a portion of said sand-resin mixture, turning the roller and dumping the sand-resin mixture into a trough, turning the trough from under the hopper and directly towards a mold mounted on rollers, heating the mold on said rollers, inserting the trough with the sand-resin mixture therein into the mold, turning the trough and dumping the sand-resin mixture into the mold while it is being revolved, withdrawing the empty trough from the mold, inserting a heating element into the mold and retaining it there for a short time only, stopping the revolving mold, removing one half of said mold, putting on one half of a pouring mold, revolving the mold half a revolution and removing the other half of said mold, putting on the other half of the pouring mold, clamping the pouring mold together with bands and pins.]

[3. A machine for forming hollow sand-resin cores and molds of the character described comprising, a hopper, a roller mounted in the bottom of said hopper, a trough, a heating bar positioned near the bottom of said hopper, a carriage structure supporting said trough and said heating bar revolvably, said roller in the bottom of said hopper having two grooves therein as a measuring container for the sand resin mixture, a circular mold supported on revolving rollers and adapted for heating, said hopper being adapted for supplying the sand-resin mixture to the grooves in said roller and further being adapted for dumping the said mixture into the said trough which is adapted to be inserted into a revolvable heated mold, a heating element for heating said bar, means for inserting the heated bar into said heated mold.]

*4. A process for forming hollow sand-resin cores and molds comprising introducing a sand-resin mixture into a receptacle having a grooved roller mounted for rotation adjacent the bottom thereof whereby a portion of the sand-resin mixture fills a groove in the roller, rotating the roller whereby the sand-resin mixture in the groove is dumped into a subjacent trough, inserting the trough with the sand-resin mixture therein into a rotating heated mold, rotating the trough whereby the sand-resin mixture is dumped into the rotating heated mold, withdrawing the empty trough from the mold, stopping the rotation of the mold, removing one-half of said mold and replacing the same with one-half ofa pouring mold, revolving the mold one-half of a revolution, removing the other half of said mold and replacing the same with*

*the other half of the pouring mold, and detachably attaching the halves of the pouring mold to each other.*

*5. Apparatus for forming hollow refractory cores and molds comprising, a hollow rotatable mold having an enlarged diameter portion at one end thereof, an elongated trough mounted for axial alignment with said mold and adapted for rotation about its longitudinal axis, means to move said trough and said mold relative to each other whereby the trough is positioned within and removed from said mold, the end of said trough adjacent said enlarged diameter portion of said mold when said trough is within said mold being enlarged in diameter and extending generally parallel to and spaced from the adjacent surface of said enlarged diameter portion of said mold for holding an additional amount of a refractory material for deposit into said enlarged diameter portion of said mold upon rotation of said trough, one edge of said trough including an edge of said enlarged diameter portion of said trough being adapted to engage and smooth the inner surface of the refractory material as the mold rotates whereby said inner surface of said refractory material corresponds generally to said edge*

*of the trough, means to introduce a measured quantity of the refractory material into said trough, means to rotate said trough about its longitudinal axis while it is within said mold whereby the refractory material is deposited within said mold, and means to rotate said mold about its longitudinal axis at a speed to hold said refractory material against the mold wall by centrifugal force.*

References Cited in the file of this patent or the original patent

UNITED STATES PATENTS

| | | |
|---|---|---|
| 1,745,424 | Hulme | Feb. 4, 1930 |
| 2,255,896 | Projahn | Sept. 16, 1941 |
| 2,317,574 | Williams | Apr. 27, 1943 |
| 2,461,765 | Olt | Feb. 15, 1949 |
| 2,688,780 | Anderson | Sept. 14, 1954 |
| 2,731,690 | Coupland | Jan. 24, 1956 |

OTHER REFERENCES

Foundry publication, July 1953, pp. 106, 107.
Foundry publication, December 1953, pp. 114–117.